(12) United States Patent
Nanba

(10) Patent No.: US 10,096,854 B2
(45) Date of Patent: Oct. 9, 2018

(54) FUEL CELL SYSTEM

(71) Applicant: TOYOTA JIDOSHA KABUSHIKI KAISHA, Toyota-shi, Aichi-ken (JP)

(72) Inventor: Ryouichi Nanba, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 328 days.

(21) Appl. No.: 14/972,229

(22) Filed: Dec. 17, 2015

(65) Prior Publication Data

US 2016/0181637 A1 Jun. 23, 2016

(30) Foreign Application Priority Data

Dec. 22, 2014 (JP) ................... 2014-259499

(51) Int. Cl.
  *H01M 8/04* (2016.01)
  *H01M 8/04992* (2016.01)
  (Continued)

(52) U.S. Cl.
  CPC ......... *H01M 8/04992* (2013.01); *B60L 1/003* (2013.01); *B60L 3/0053* (2013.01); *B60L 11/1874* (2013.01); *B60L 11/1883* (2013.01); *H01M 8/04029* (2013.01); *H01M 8/04067* (2013.01); *H01M 8/04089* (2013.01); *H01M 8/0494* (2013.01); *H01M 8/04291* (2013.01); *H01M 8/04313* (2013.01); *H01M 8/04694* (2013.01); *H01M 8/04701* (2013.01); *H01M 8/04731* (2013.01); *H01M 8/04753* (2013.01);
  (Continued)

(58) Field of Classification Search
  None
  See application file for complete search history.

(56) References Cited

U.S. PATENT DOCUMENTS

2010/0323263 A1* 12/2010 Katano ............ H01M 8/04089
429/444

FOREIGN PATENT DOCUMENTS

JP  2007309379 A  11/2007
JP  2008082439 A  4/2008
(Continued)

OTHER PUBLICATIONS

Deshpande. "Effect of Vibrations on Performance of Polymer Electrolyte Membrane Fuel Cells." Energy Procedia. vol. 54, 2014, pp. 756-762 (Year: 2014).*

*Primary Examiner* — Sarah A. Slifka
*Assistant Examiner* — Haroon S. Sheikh
(74) *Attorney, Agent, or Firm* — Hunton Andrews Kurth LLP

(57) ABSTRACT

A fuel cell system includes a stacked assembly, a resonance determining unit, and a controller. The stacked assembly includes a plurality of unit cells stacked together. Each of the unit cells includes an electrolyte membrane, and a pair of electrodes between which the electrolyte membrane is sandwiched. The resonance determining unit is configured to determine whether vibration of the stacked assembly which occurs during running of a vehicle is within a resonance region of the stacked assembly. The controller is configured to change a natural frequency of the stacked assembly such that the vibration of the stacked assembly falls outside the resonance region, if the resonance determining unit determines that the vibration of the stacked assembly is within the resonance region.

15 Claims, 12 Drawing Sheets

(51) Int. Cl.
*H01M 8/04313*    (2016.01)
*H01M 8/04701*    (2016.01)
*H01M 8/04746*    (2016.01)
*H01M 8/04828*    (2016.01)
*H01M 8/04007*    (2016.01)
*H01M 8/04089*    (2016.01)
*H01M 8/04291*    (2016.01)
*H01M 8/04029*    (2016.01)
*H01M 8/04694*    (2016.01)
*H01M 8/04791*    (2016.01)
*B60L 1/00*    (2006.01)
*B60L 3/00*    (2006.01)
*B60L 11/18*    (2006.01)
*H01M 8/1018*    (2016.01)

(52) U.S. Cl.
CPC ... *H01M 8/04768* (2013.01); *H01M 8/04798* (2013.01); *H01M 8/04828* (2013.01); *H01M 8/04947* (2013.01); *B60L 2240/36* (2013.01); *B60L 2270/145* (2013.01); *H01M 2008/1095* (2013.01); *H01M 2250/20* (2013.01); *Y02T 10/705* (2013.01); *Y02T 90/32* (2013.01); *Y02T 90/34* (2013.01)

(56) References Cited

FOREIGN PATENT DOCUMENTS

| | | |
|---|---|---|
| JP | 2010-027543 A | 2/2010 |
| JP | 2010188433 A | 9/2010 |
| JP | 2012-133965 A | 7/2012 |

\* cited by examiner

FUEL CELL SYSTEM

INCORPORATION BY REFERENCE

The disclosure of Japanese Patent Application No. 2014-259499 filed on Dec. 22, 2014 including the specification, drawings and abstract is incorporated herein by reference in its entirety.

BACKGROUND

1. Field of the Invention

Embodiments of the present invention relate to a fuel cell system.

2. Description of Related Art

In order to avoid so-called undulation or stacking misalignment of unit cells in a stacked assembly (fuel cell stack) used as a power source for driving a vehicle, it has been proposed to increase the resonance frequency of the stacked body formed by staking the unit cells (see, for example, Japanese Patent Application Publication No. 2012-133965 (JP 2012-133965 A)). According to JP 2012-133965 A, a spring element is mounted in a direction of displacement of the stacked assembly, to increase the resonance frequency of the stacked assembly, so that vibration of the stacked assembly during running of the vehicle does not occur at the resonance frequency.

However, the system disclosed in JP 2012-133965 A increases the resonance frequency by way of hardware configuration; therefore, the parts count or the number of components may be increased, which may result in increased cost. Even though the likelihood of occurrence of vibration of the stacked assembly at the resonance frequency can be reduced by increasing the resonance frequency, the vibration of the stacked assembly may be more likely to occur at the resonance frequency, due to deterioration of parts, and the initial assembling conditions. Also, in the system disclosed in JP 2012-133965 A, the vibration of the stacked assembly may occur at the resonance frequency in accordance with changes in the conditions of the stacked assembly, such as deterioration of its parts.

SUMMARY

Embodiments of the present invention provide a fuel cell system.

A fuel cell system according to an aspect of the invention includes a stacked assembly, a resonance determining unit, and a controller. The stacked assembly includes a plurality of unit cells stacked together. Each of the unit cells includes an electrolyte membrane, and a pair of electrodes between which the electrolyte membrane is sandwiched. The resonance determining unit is configured to determine whether vibration of the stacked assembly which occurs during running of a vehicle is within a resonance region of the stacked assembly. The controller is configured to change a natural frequency of the stacked assembly such that the vibration of the stacked assembly falls outside the resonance region, if the resonance determining unit determines that the vibration of the stacked assembly is within the resonance region. According to the above aspect of the invention, a resonance phenomenon of the stacked assembly can be avoided while increase of the parts count is curbed, even if conditions of the fuel cell change due to chronological changes, etc.

In the aspect of the invention, the controller may be configured to change a length of the stacked assembly in a stacking direction of the unit cells, if the resonance determining unit determines that the vibration of the stacked assembly is within the resonance region. With this arrangement, the natural frequency of the stacked assembly can be changed.

In the aspect of the invention, the controller may be configured to increase or reduce a temperature of the stacked assembly if the resonance determining unit determines that the vibration of the stacked assembly is within the resonance region. With this arrangement, the natural frequency of the stacked assembly can be changed.

In the above configuration, the fuel cell system may further include a water pump configured to supply a coolant to the stacked assembly. The controller may be configured to change a rotational speed of the water pump to increase or reduce the temperature of the stacked assembly if the resonance determining unit determines that the vibration of the stacked assembly is within the resonance region.

In the above configuration, the controller may be configured to increase or reduce a fastening load applied to the stacked assembly in the stacking direction of the unit cells if the resonance determining unit determines that the vibration of the stacked assembly is within the resonance region. With this arrangement, the natural frequency of the stacked assembly can be changed.

In the above configuration, the fuel cell system may further include an actuator configured to change the fastening load. The controller may be configured to control the actuator to increase or reduce the fastening load if the resonance determining unit determines that the vibration of the stacked assembly is within the resonance region.

In the aspect of the invention, the controller may be configured to increase or reduce a pressure of a fluid supplied to the stacked assembly if the resonance determining unit determines that the vibration of the stacked assembly is within the resonance region. With this arrangement, the natural frequency of the stacked assembly can be changed.

In the above configuration, the fuel cell system may further include a gas supply device configured to supply a reaction gas into the stacked assembly. The controller may be configured to control the gas supply device to increase or reduce the pressure of the reaction gas if the resonance determining unit determines that the vibration of the stacked assembly is within the resonance region.

In the aspect of the invention, the controller may be configured to increase or reduce an amount of liquid water contained in the stacked assembly if the resonance determining unit determines that the vibration of the stacked assembly is within the resonance region. With this arrangement, the natural frequency of the stacked assembly can be changed.

In the above configuration, the controller may be configured to increase a flow rate of a fluid supplied to the stacked assembly to reduce the amount of liquid water contained in the stacked assembly if the resonance determining unit determines that the vibration of the stacked assembly is within the resonance region. With this arrangement, the natural frequency of the stacked assembly can be changed.

In the above configuration, the controller may be configured to increase an amount of electric power generated in the stacked assembly to increase the amount of liquid water contained in the stacked assembly if the resonance determining unit determines that the vibration of the stacked assembly is within the resonance region. In addition, the controller may be configured to reduce the amount of electric power generated in the stacked assembly to reduce the amount of liquid water contained in the stacked assembly if the resonance determining unit determines that the vibration of the stacked assembly is within the resonance region. With this arrangement, the natural frequency of the stacked assembly can be changed.

In the above configuration, the controller may be configured to reduce a pressure of a fluid supplied to the stacked assembly to reduce the amount of liquid water contained in the stacked assembly if the resonance determining unit determines that the vibration of the stacked assembly is within the resonance region. With this arrangement, the natural frequency of the stacked assembly can be changed.

A fuel cell system according to a second aspect of the invention includes a stacked assembly, an acceleration sensor, a natural frequency control device, and a controller. The stacked assembly includes a plurality of unit cells stacked together.

Each of the unit cells includes an electrolyte membrane, and a pair of electrodes between which the electrolyte membrane is sandwiched. The acceleration sensor is installed on the stacked assembly and configured to analyze vibration of the stacked assembly to determine whether the vibration of the stacked assembly is within a resonance region of the stacked assembly. The natural frequency control device is configured to change at least one of a length of the stacked assembly, a density of the stacked assembly, and a modulus of longitudinal elasticity of the stacked assembly. The controller is configured to control the natural frequency control device to change at least one of the length of the stacked assembly, the density of the stacked assembly, and the modulus of longitudinal elasticity of the stacked assembly if the vibration of the stacked assembly analyzed by the acceleration sensor is within the resonance region.

In the second aspect of the invention, the natural frequency control device may be configured to change at least one of an amount of a fluid supplied to the stacked assembly and a pressure of the fluid supplied to the stacked assembly if the vibration of the stacked assembly analyzed by the acceleration sensor is within the resonance region.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
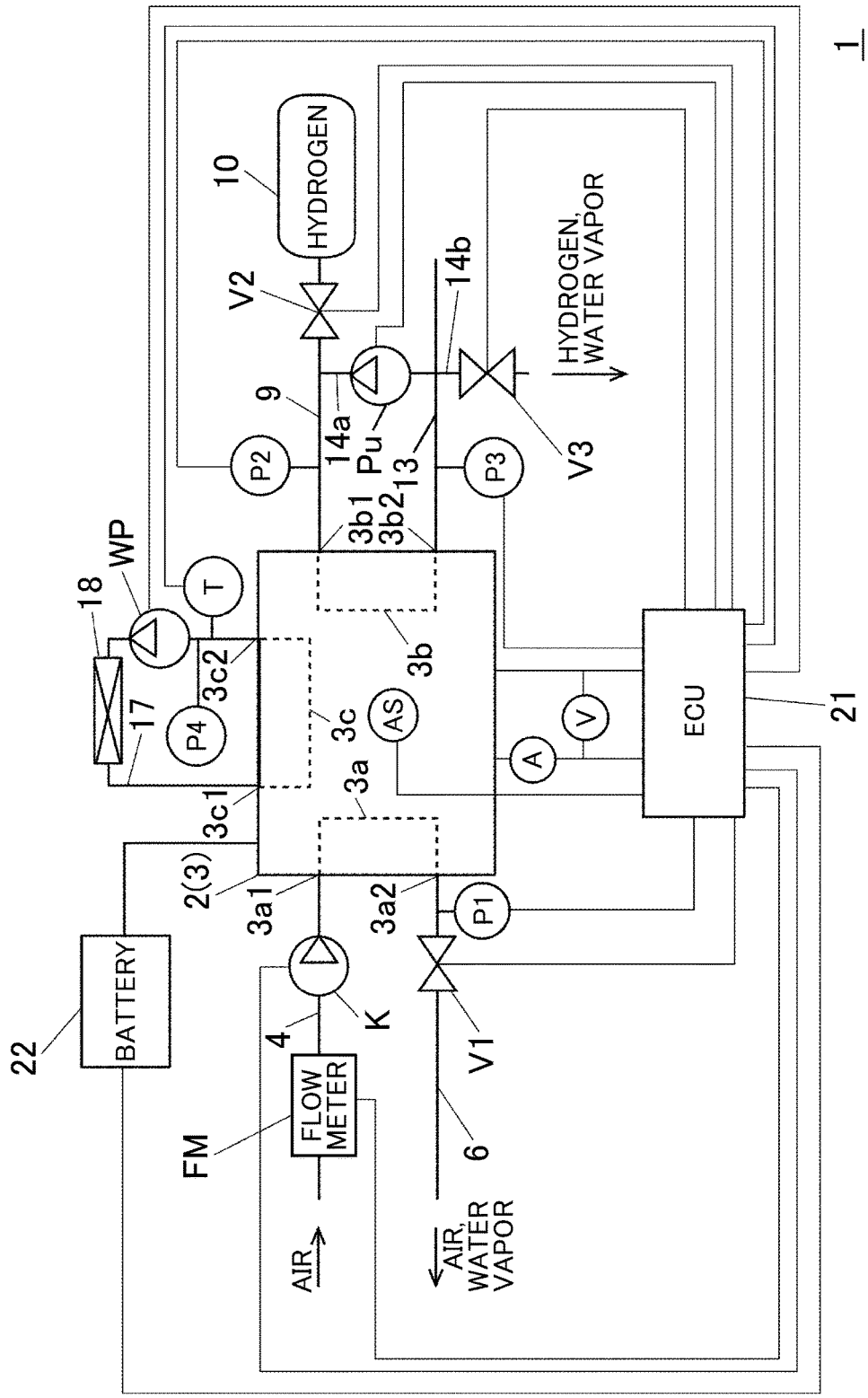
FIG. 1 is an explanatory view showing the general configuration of a fuel cell system according to embodiments of the invention.

Some embodiments of the invention will be described with reference to the accompanying drawings. In the drawings, parts may not be illustrated such that the dimensions, ratios, etc. of the respective parts are completely identical with those of the actual parts. Also, some elements that appear in the following description may not be depicted in FIG. 1.

Figure 2:
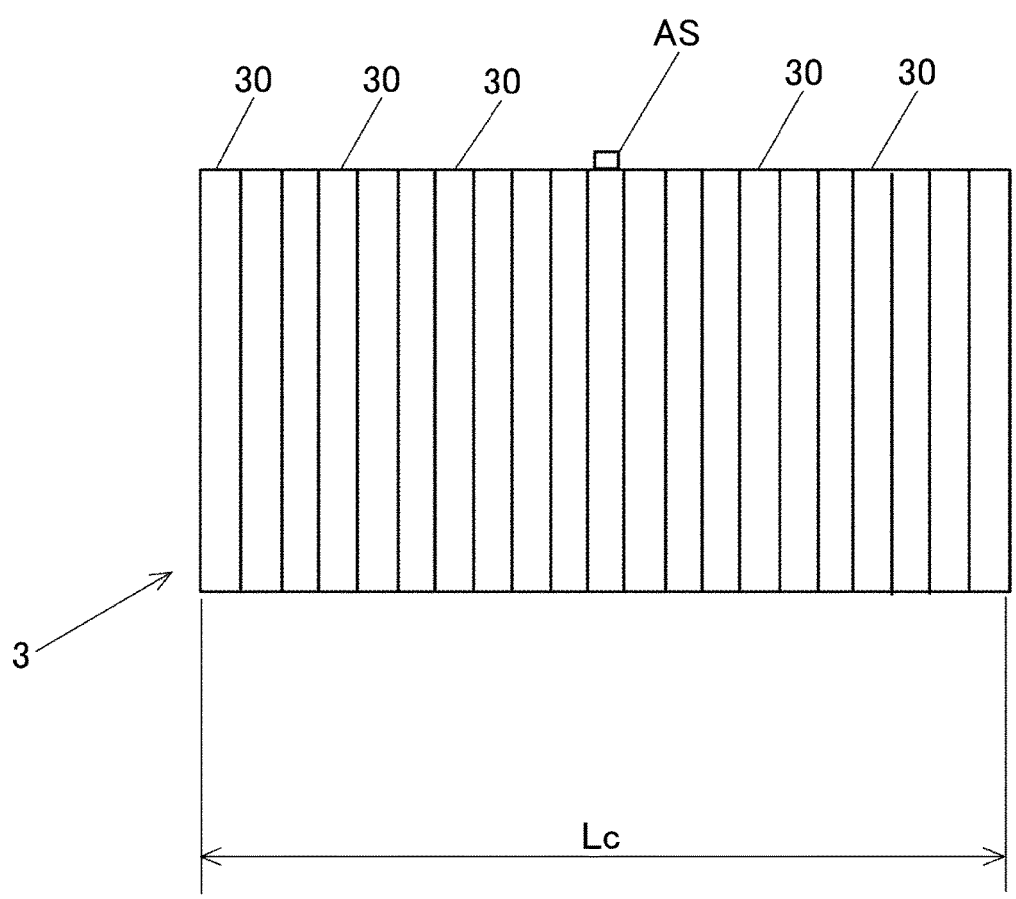
FIG. 2 is an explanatory view schematically showing a stacked assembly according to the embodiments of the invention.

Referring initially to FIG. 1, a fuel cell system 1 of the embodiments will be described. FIG. 1 is an explanatory view showing the general configuration of the fuel cell system 1 of the embodiments. FIG. 2 is an explanatory view schematically showing a stacked assembly 3 in the embodiments. The fuel cell system 1 is installed on a vehicle, and is mainly used as a power supply for driving the vehicle. However, a similar system may be installed on various moving objects, such as a ship, airplane, and a robot, for use in these objects. The fuel cell system 1 includes a solid polymer fuel cell 2. The fuel cell 2 includes the stacked assembly 3 formed by stacking a plurality of unit cells 30 together. Each of the unit cells 30 has an electrolyte membrane, and electrodes, i.e., a cathode electrode and an anode electrode, between which the electrolyte membrane is sandwiched. A cathode channel 3a and an anode channel 3b are formed in the stacked assembly 3. The electrolyte membrane is a proton conducting, solid polymer electrolyte membrane. In FIG. 1, the unit cells 30 are not illustrated. In the unit cell 30, hydrogen gas, or anode gas, is supplied to the anode electrode, and air containing oxygen, or cathode gas, is supplied to the cathode electrode. Then, hydrogen ions generated by catalytic reactions at the anode electrode pass through the electrolyte membrane, and move to the cathode electrode, so as to induce electrochemical reactions with oxygen and generate electric power. A voltmeter V that measures a voltage value of electricity thus generated, and an ammeter A that measures a current value, are connected to the stacked assembly 3 formed by stacking the unit cells 30 together. A coolant channel 3c through which a coolant for cooling the stacked assembly 3 flows is provided in the stacked assembly 3. The coolant that flows through the coolant channel 3c cools the stacked assembly 3. The cathode gas or anode gas may be regarded as the reaction gas of the invention.

As shown in FIG. 2, the stacked assembly 3 includes a plurality of unit cells 30 that are stacked together. In FIG. 2, Lc represents the length of the stacked assembly 3 as measured in the stacking direction of the unit cells 30. An acceleration sensor AS is installed on a unit cell 30 located in a central portion of the stacked assembly 3, out of the unit cells 30 stacked together. The acceleration sensor AS is installed on the unit cell 30 located in the central portion of the stacked assembly 3, so as to observe the behavior of the unit cell 30 located in the central portion of the stacked assembly 3, in view of the fact that the amplitude of vibration is maximized in the central portion of the stacked assembly 3. With the acceleration sensor AS thus installed, the acceleration of the unit cell 30 located in the central portion of the stacked assembly 3 can be determined, and how the stacked assembly 3 vibrates can be analyzed. The acceleration sensor AS that is thus able to analyze the vibration of the stacked assembly 3 may be regarded as a part of the resonance determining unit of the invention. The velocity is obtained by integrating the acceleration measured by the acceleration sensor AS with respect to time once, and the displacement is obtained by integrating the acceleration with respect to time twice; therefore, an analysis using displacement may be conducted when the vibration of the stacked assembly 3 is analyzed. Namely, a resonance region which will be described below may be set based on the displacement.

A cathode gas supply channel 4 is connected to an inlet of the stacked assembly 3, more specifically, an inlet 3a1 side of the cathode channel 3a of the stacked assembly 3. An air cleaner is mounted in an end portion of the cathode gas supply channel 4. A compressor K for feeding the cathode gas under pressure and supplying the cathode gas to the stacked assembly 3 is disposed in the cathode gas supply channel 4. A flow meter FM for measuring the flow rate of air supplied as cathode gas is installed in the cathode gas supply channel 4 upstream of the compressor K.

A cathode offgas discharge channel 6 is connected to an outlet 3a2 side of the cathode channel 3a of the stacked assembly 3. A back pressure valve V1 is disposed in the cathode offgas discharge channel 6. The back pressure valve V1 regulates a cathode back pressure, namely, a pressure in a region downstream of the compressor K of the cathode gas supply channel 4 and upstream of the back pressure valve V1 of the cathode offgas discharge channel 6, which region includes the cathode channel 3a. In the cathode offgas discharge channel 6, a muffler is located downstream of the back pressure valve V1. When the back pressure valve V1 is opened, air and water vapor are discharged. A first pressure gauge P1 is installed between the outlet 3a2 of the cathode channel 3a and the back pressure valve V1. The first pressure gauge P1 measures the air pressure in the stacked assembly 3. When the back pressure valve V1 is opened, the air pressure measured by the first pressure gauge P1 is reduced.

An anode supply channel 9 is connected to an inlet 3b1 side of the anode channel 3b of the stacked assembly 3. A hydrogen tank 10 that serves as a hydrogen supply source is connected to an end portion of the anode supply channel 9. High-pressure hydrogen is stored in the hydrogen tank 10. A pressure regulating valve V2 for regulating the pressure of hydrogen is installed in the anode supply channel 9. An exhaust pipe 13 is connected to an outlet 3b2 side of the anode channel 3b of the stacked assembly 3. A gas-liquid separator is installed in an end portion of the exhaust pipe 13. In the gas-liquid separator, the exhaust pipe 13 branches into a circulation channel 14a and a purge channel 14b. In the gas-liquid separator, water contained in anode offgas is separated. The anode offgas from which water has been separated is discharged toward the circulation channel 14a. On the other hand, the water thus separated is discharged toward the purge channel 14b. A circulation pump Pu is installed in the circulation channel 14a. The circulation channel 14a is connected to the anode supply channel 9, and, through operation of the circulation pump Pu, the anode offgas is supplied again to the anode channel 3b. A shutoff valve V3 is installed in the purge channel 14b that branches off from the exhaust pipe 13 in the gas-liquid separator. When the shutoff valve V3 is opened, anode offgas that is not to be circulated, namely hydrogen, can be discharged along with water vapor. In the anode supply channel 9, a second pressure gauge P2 is installed between the circulation channel 14a and the inlet 3b1 of the anode channel 3b. Also, in the exhaust pipe 13, a third pressure gauge P3 is installed between the outlet 3b2 of the anode channel 3b and a branch point of the circulation channel 14a.

One end of a coolant circulation channel 17 is connected to an inlet 3c1 of a coolant channel 3c of the stacked assembly 3. Also, the other end of the coolant circulation channel 17 is connected to an outlet 3c2 of the coolant channel 3c. A water pump WP for circulating the coolant and supplying the coolant to the interior of the stacked assembly 3 is installed in the coolant circulation channel 17. Also, a radiator 18 is installed in the coolant circulation channel 17. The radiator 18 includes a fan, and air is blown toward the radiator 18 when the fan is driven. A water temperature gauge T and a fourth pressure gauge P4 are installed between the radiator 18 and the outlet 3c2 of the coolant channel 3c.

The fuel cell system 1 includes an electronic control unit (ECU) 21. The ECU 21 is configured as a microcomputer incorporating CPU, ROM, and RAM, and functions as a controller. The ECU 21 stores a current-voltage map, and so forth. The ECU 21 performs an output setting operation to set the output of the fuel cell system 1. Namely, during normal operation, the ECU 21 sets an output current value, based on the air supply amount, cathode back pressure, hydrogen supply amount, hydrogen pressure, output history, voltage, current value map, and so forth.

Also, the ECU 21 may cooperate with the acceleration sensor AS to function as the resonance determining unit. To the ECU 21, the compressor K, flow meter FM, back pressure valve V1, pressure regulating valve V2, shutoff valve V3, first pressure gauge P1, second pressure gauge P2, third pressure gauge P3, fourth pressure gauge P4, circulation pump Pu, water pump WP, and the water temperature gauge T are electrically connected. These devices change conditions of the stacked assembly 3, in response to commands of the ECU 21 that functions as the controller, and are used when the natural frequency of the stacked assembly 3 is to be changed. A battery 22 connected to the fuel cell 2 is electrically connected to the ECU 21, and the ECU 21 can be informed of the state of charge of the battery 22. The compressor K or the circulation pump Pu may be regarded as the gas supply device of embodiments of the invention. Also, the water pump WP, and actuators 8a and air actuator 16 which will be described later, circulation pump Pu, or the compressor K may be regarded as the natural frequency control device of embodiments of the invention.

The fuel cell system 1, whose general configuration has been described above, normally operates under control of the ECU 21, so that supply, discharge, etc. of air and hydrogen are controlled so as to enable the fuel cell 2 to generate electric power according to the required output. When the acceleration sensor AS and the ECU 21 cooperate with each other to determine that vibration of the stacked assembly 3 is within a resonance region, the fuel cell system 1 changes the natural frequency of the stacked assembly 3 so that the vibration of the stacked assembly 3 falls outside the resonance region.

Here, the principle according to which the natural frequency of the stacked assembly 3 is changed will be described. Initially, the natural frequency of a structure in general will be described. The natural frequency (resonance point) can be expressed by the following equation 1.

$$fn = \frac{kn^2}{2\pi}\sqrt{\frac{EI}{\rho AL}} \quad \text{(Eq. 1)}$$

fn: natural frequency (resonance point)
kn: constant
E: modulus of longitudinal elasticity
I: moment of inertia of area
A: cross-sectional area
ρ: density
Lc: length Accordingly, in the structure in general, the natural frequency can be changed by changing each parameter included in Eq. 1. If Eq. 1 is applied to the stacked assembly 3 of the fuel cell system 1, the length Lc, modulus of longitudinal elasticity E, and density p, out of the above-indicated parameters, can be changed. Thus, in the fuel cell system 1 of the embodiments, the natural frequency of the stacked assembly 3 is changed by changing these parameters. If the natural frequency of the stacked assembly 3 is changed when the vibration of the stacked assembly 3 is within the resonance region, the vibration of the stacked assembly 3 can get out of the resonance region. It is, however, to be noted that Eq. 1 is an equation generalized with a simple model, whereas the actual stacked assembly 3 is a structure consisting of a multiplicity of components integrated in a complicated fashion. Therefore, if Eq. 1 is applied to the actual stacked assembly 3, the parameters may be influenced by each other, and it is difficult to uniquely calculate the natural frequency. In this embodiment, it is not necessary to accurately calculate the natural frequency, but any of the above-indicated parameters can be changed, so as to change the natural frequency of the stacked assembly 3 and cause the vibration of the stacked assembly 3 to get out of the resonance region.

In the following, specific embodiments will be described in which controls for changing various parameters are performed. While the content of each of the controls is different depending on the parameter to be changed, the fuel cell system 1 shown in FIG. 1 is used in common, as the basic configuration of the fuel cell system 1. The control of the fuel cell system 1 is mainly performed by the ECU 21. A first embodiment and a second embodiment are examples in which the parameter to be changed is the length Lc, and a third embodiment is an example in which the parameter to be changed is the modulus of longitudinal elasticity E. A fourth embodiment through a sixth embodiment are examples in which the parameter to be changed is the density p. When Eq. 1 is applied to the stacked assembly 3, the length Lc is a length as measured in the stacking direction, as shown in FIG. 2. Also, the cross-section is a plane perpendicular to the stacking direction.

Figure 3:
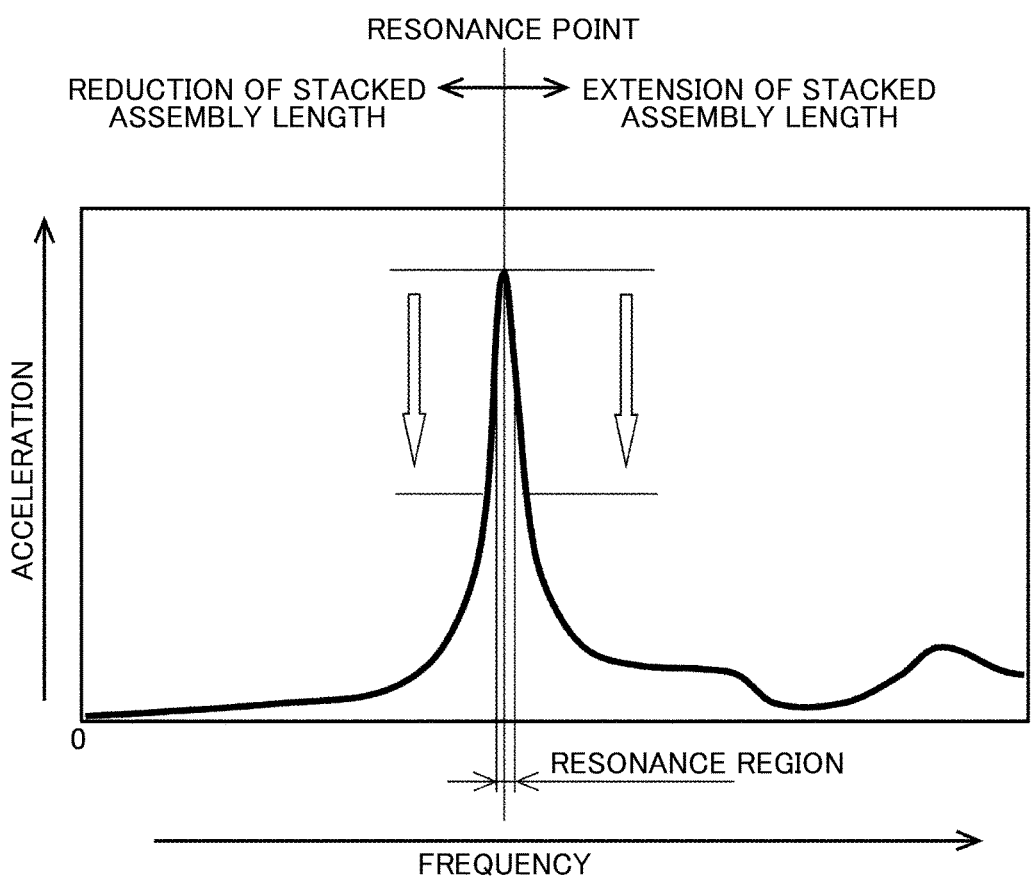
FIG. 3 is a graph indicating a resonance region of the stacked assembly in some of the embodiments of the invention.

In the first embodiment and the second embodiment, the natural frequency of the stacked assembly 3 is changed by changing the length Lc of the stacked assembly 3. Referring to FIG. 3, the acceleration detected by the acceleration sensor AS rapidly rises at a certain frequency. Since the acceleration may be regarded as a value indicating the amplitude, the frequency at which the acceleration is at its peak can be determined as the resonance point. As is apparent from FIG. 3, the acceleration rapidly increases in a certain frequency region, and rapidly decreases once it exceeds the resonance point. Thus, a region around the resonance point is set as a resonance region, and it is determined that the stacked assembly 3 is in a resonant condition when it is within the resonance region. The resonance region is not uniquely determined, but may be arbitrarily set. The natural frequency is reduced as the length Lc of the stacked assembly 3 is increased, and the natural frequency is increased as the length Lc of the stacked assembly 3 is reduced. Accordingly, the natural frequency can get out of the resonance region, by either increasing or reducing the length Lc of the stacked assembly 3.

Figure 4:
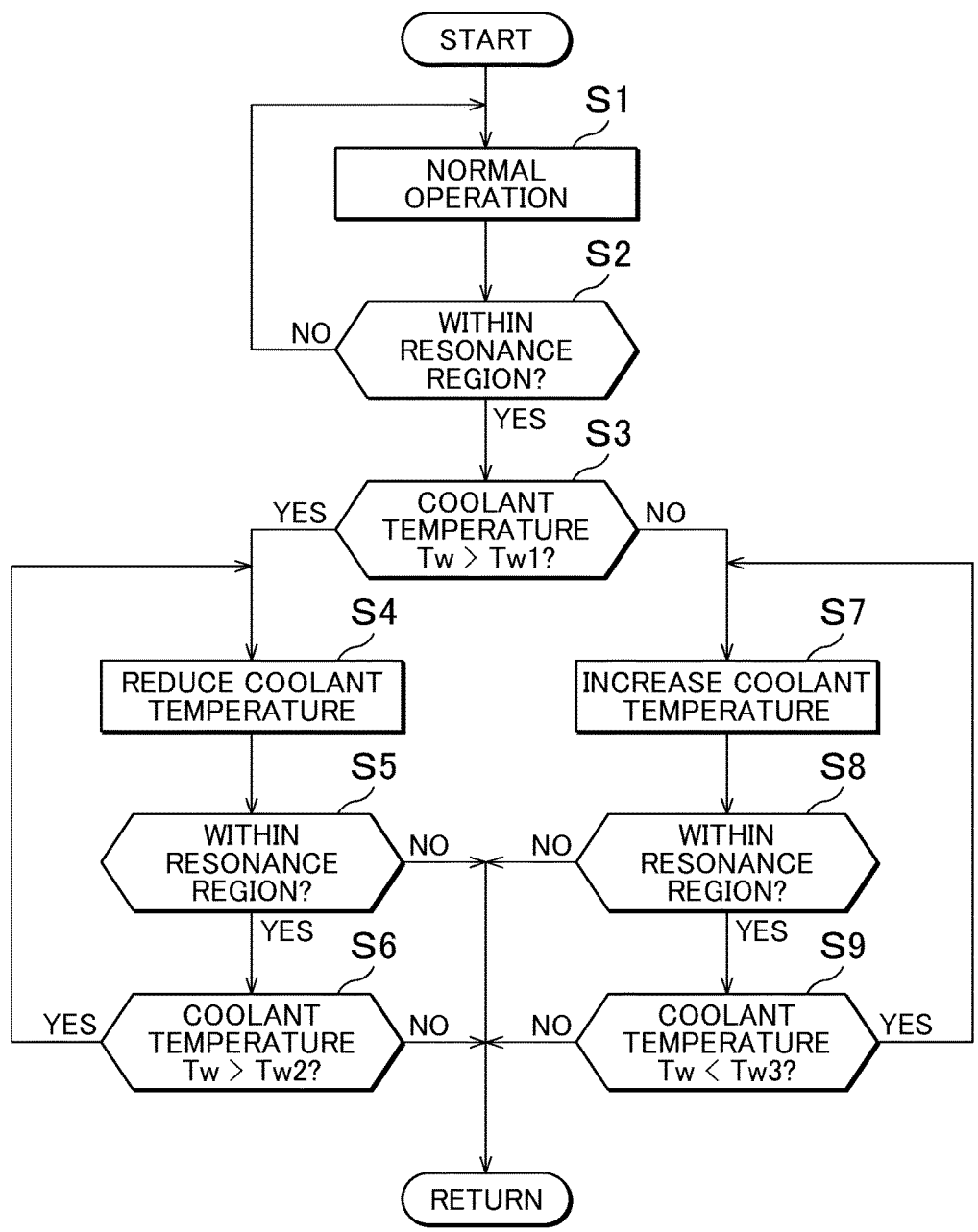
FIG. 4 is a flowchart illustrating one example of control of a fuel cell system according to one embodiment of the invention.

Initially, the first embodiment will be described with reference to the flowchart shown in FIG. 4. In the first embodiment, the ECU 21 changes the length Lc of the stacked assembly 3, by raising or lowering the temperature of the stacked assembly 3, so as to change the natural frequency. Namely, the natural frequency is changed by utilizing change of the length of the stacked assembly 3 based on the temperature. Thus, in the first embodiment, the temperature of the stacked assembly 3 is changed; more specifically, the coolant temperature Tw that is correlated with the temperature of the stacked assembly 3 is controlled, thereby to change the temperature of the stacked assembly 3. The control of the first embodiment is executed at the time when operation of the fuel cell system 1 is started, such as when the ignition is placed in the ON position. This point is also applied to the other embodiments. Initially, in step S1, the ECU 21 performs normal operation. Namely, the ECU 21 performs operation according to a request for electric power generation, on the fuel cell 2. Then, in step S2 following step S1, it is determined whether vibration of the stacked assembly 3 is within a resonance region. More specifically, it is determined whether the acceleration measured by the acceleration sensor AS is within a resonance region. If a negative decision (NO) is obtained in step S2, the ECU 21 returns to step S1, to continue normal operation. If, on the other hand, an affirmative decision (YES) is obtained in step S2, the ECU 21 proceeds to step S3.

In step S3, it is determined whether the coolant temperature Tw measured by the water temperature gauge T is higher than a reference value Tw1. The reference value Tw1 of the coolant temperature is a value arbitrarily set among or selected from values that can be taken when the fuel cell 2 is in operation, and is a value between a lower-limit value Tw2 of the coolant temperature Tw and an upper-limit value Tw3 of the coolant temperature Tw. If the coolant temperature Tw lies between the lower-limit value Tw2 and the upper-limit value Tw3, it may be increased or reduced in principle. Thus, in the first embodiment, the coolant temperature Tw is reduced when it is higher than the reference value Tw1, and the coolant temperature Tw is increased when it is lower than the reference value Tw1. In this manner, the stacked assembly 3 gets out of the resonance region.

If an affirmative decision (YES) is obtained in step S3, the ECU 21 proceeds to step S4. In step S4, coolant temperature reduction control is performed. More specifically, the rotational speed of the water pump WP is increased so as to increase the flow rate of the coolant, so that the amount of heat removed from the stacked assembly 3 is increased, for example. As a result, the temperature of the stacked assembly 3 is reduced, and the length Lc of the stacked assembly 3 is reduced with reduction in the temperature. In step S5 following step S4, it is determined again whether the vibration of the stacked assembly 3 is within the resonance region. If a negative decision (NO) is obtained in step S5, namely, when it is determined that the natural frequency of the stacked assembly 3 falls outside the resonance region, the control returns. On the other hand, if an affirmative decision (YES) is obtained in step S5, the ECU 21 proceeds to step S6. In step S6, it is determined whether the coolant temperature Tw is higher than the lower-limit value Tw2. The lower-limit value Tw2 may be set in view of the amount of water contained in the stacked assembly 3. Namely, if the coolant temperature Tw is excessively reduced, and the temperature of the stacked assembly 3 is also excessively reduced, it becomes difficult to discharge water in the stacked assembly 3, and the amount of water contained in the stacked assembly 3 becomes excessively large. The lower-limit value Tw2 is set from this point of view. If an affirmative decision (YES) is obtained in step S6, namely, if the coolant temperature Tw is higher than the lower-limit value Tw2, and there is room for further reduction of the coolant temperature Tw, the ECU 21 returns to step S4, and continues control for reducing the coolant temperature Tw. If a negative decision (NO) is obtained in step S6, the control returns.

If a negative decision (NO) is obtained in step S3, the ECU 21 proceeds to step S7. In step S7, coolant temperature increase control is performed. More specifically, the rotational speed of the water pump WP is reduced, so that the flow rate of the coolant is reduced, for example. As a result, the temperature of the stacked assembly 3 is increased, and the length Lc of the stacked assembly 3 is increased with increase in the temperature. In step S8 following step S7, it is determined again whether the vibration of the stacked assembly 3 is within the resonance region. If a negative decision (NO) is obtained in step S8, namely, if the natural frequency of the stacked assembly 3 falls outside the resonance frequency, the control returns. If, on the other hand, an affirmative decision (YES) is obtained in step S8, the ECU 21 proceeds to step S9. In step S9, it is determined whether the coolant temperature Tw is lower than the upper-limit value Tw3. The upper-limit value Tw3 may be set in view of the amount of water contained in the stacked assembly 3. Namely, if the coolant temperature Tw becomes excessively high, and the temperature of the stacked assembly 3 becomes excessively high, the interior of the stacked assembly 3 is brought into a dry condition, and reactions for electric power generation are less likely to occur in the stacked assembly. Thus, the upper-limit value Tw3 is set from this point of view. If an affirmative decision (YES) is obtained in step S9, namely, if the coolant temperature Tw is lower than the upper-limit value Tw3, and there is room for further increase of the coolant temperature Tw, the ECU 21 returns to step S7, and continues control for increasing the coolant temperature Tw. On the other hand, if a negative decision (NO) is obtained in step S9, the control returns.

As described above, the vibration of the stacked assembly 3 can get out of the resonance region, by increasing or reducing temperature of the stacked assembly 3, and changing the natural frequency of the stacked assembly 3. Thus, the stacked assembly 3 can avoid a resonance phenomenon.

Figure 5:
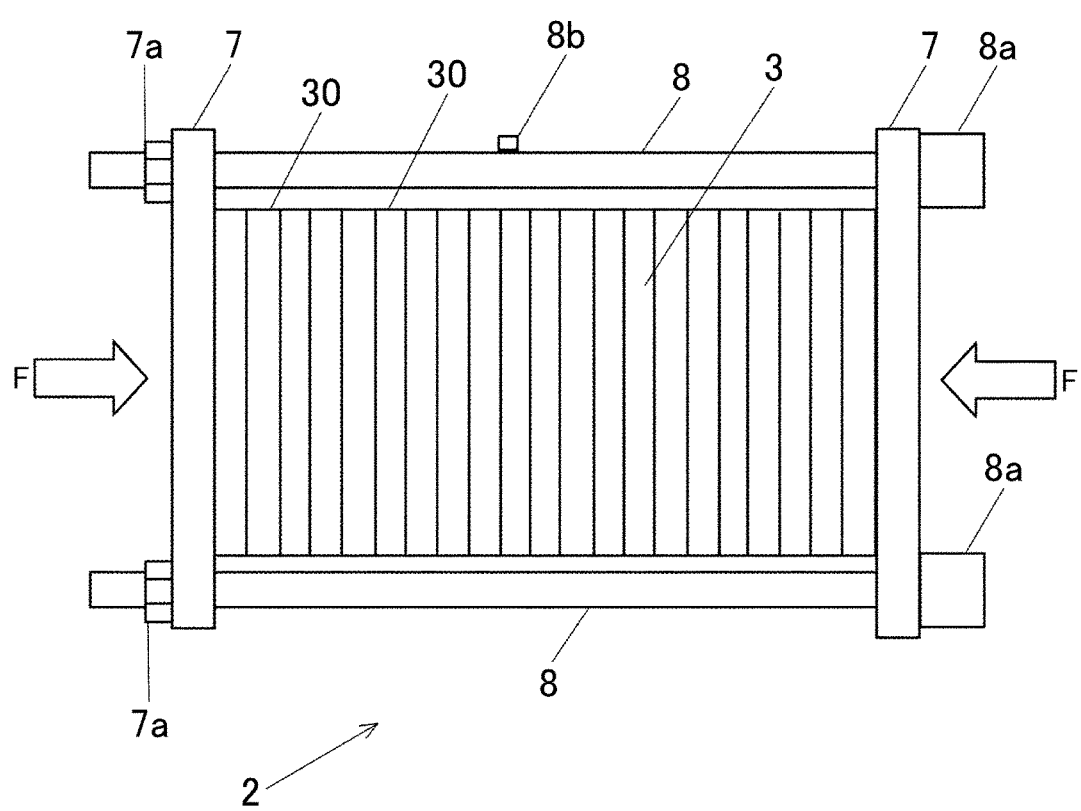
FIG. 5 is an explanatory view schematically showing a stacked condition of unit cells of a stacked assembly according to one embodiment of the invention.
Figure 6:
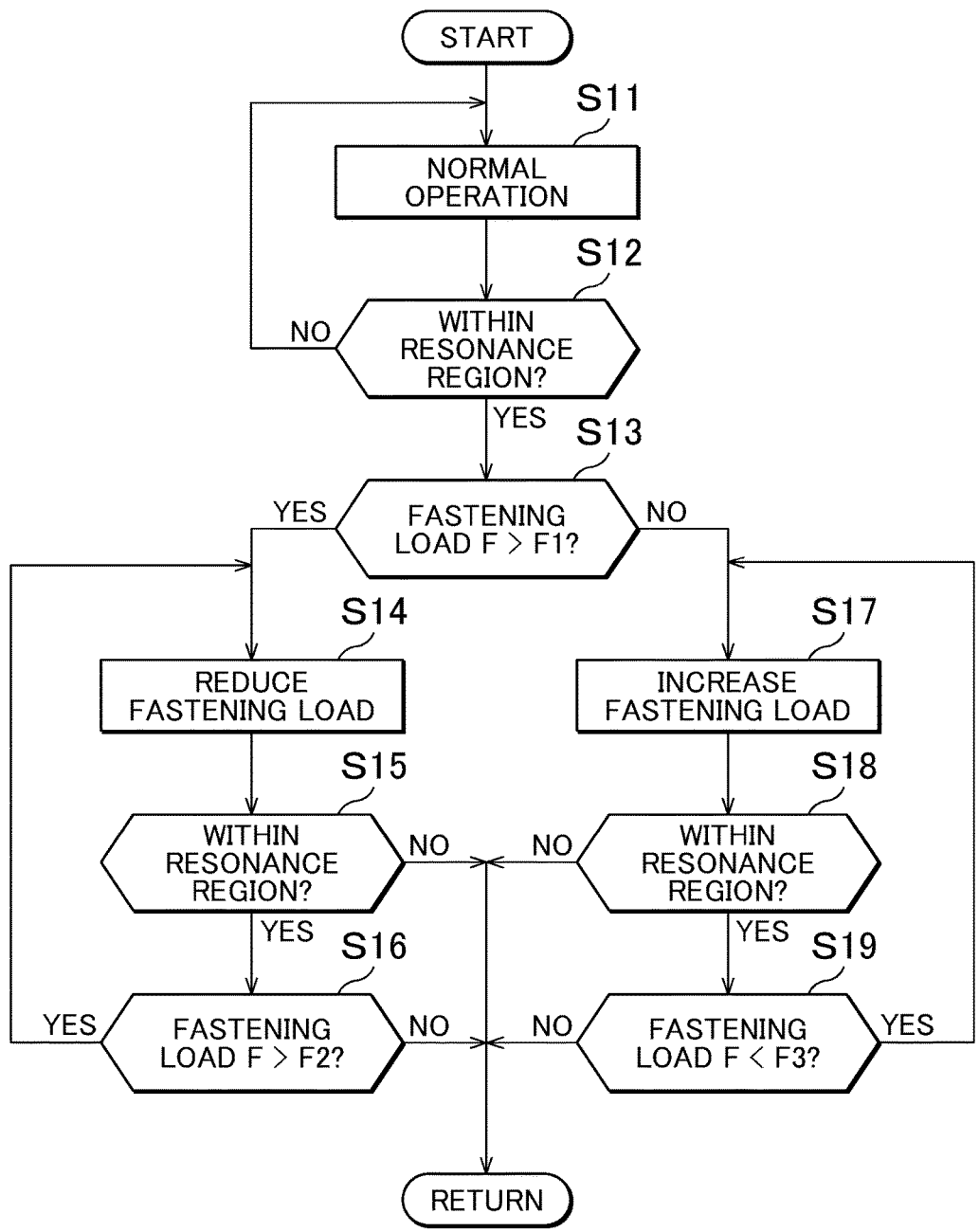
FIG. 6 is a flowchart illustrating one example of control of a fuel cell system according to one embodiment of the invention.
Figure 7:
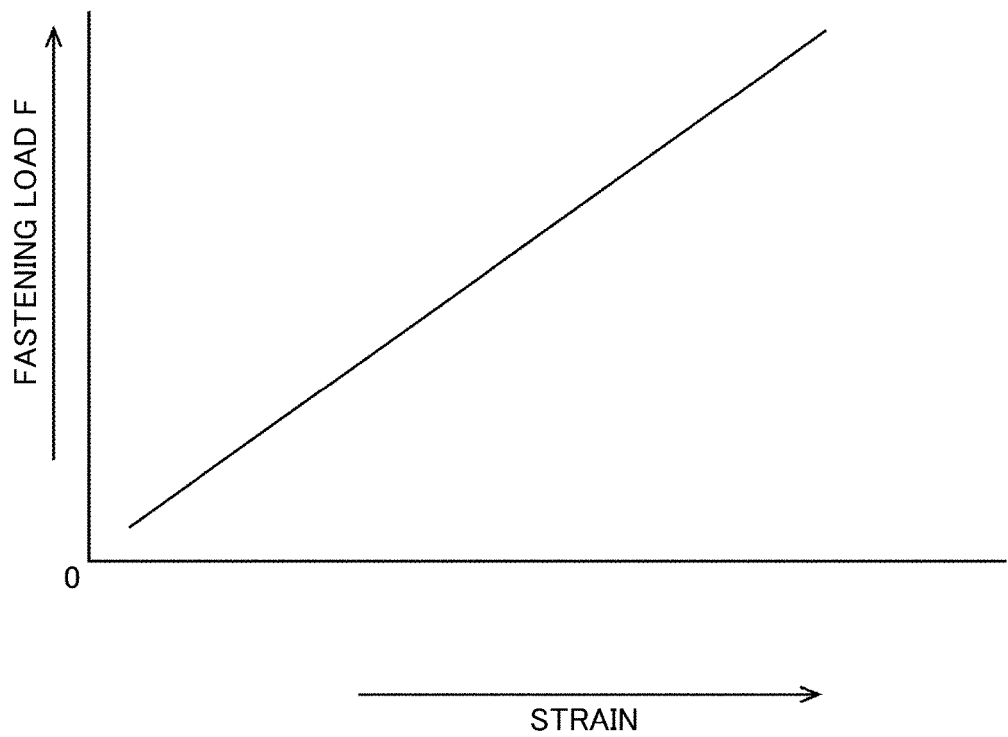
FIG. 7 is an example of graph indicating the relationship between strain and a fastening load of a fastening bolt in one embodiment of the invention.

Next, the second embodiment of the invention will be described with reference to FIG. 5 through FIG. 7. In the second embodiment, the natural frequency of the stacked assembly 3 is changed by changing the length Lc of the stacked assembly 3, as in the first embodiment. However, the second embodiment is different from the first embodiment in that the length Lc of the stacked assembly 3 is mechanically changed. Also, the second embodiment is different from the other embodiments in that a mechanism for mechanically changing the length of the stacked assembly 3 is provided. More specifically, in the second embodiment, actuators 8a capable of changing the fastening load F of the stacked assembly 3 are provided, as shown in FIG. 5. Here, the actuators 8a will be described. The fuel cell 2 includes end plates 7 on the opposite sides of the stacked assembly 3. Nuts 7a are secured to one of the end plates 7, and bolts 8 are screwed into the nuts 7a. The actuators 8a, which are electrically connected to the ECU 21, rotate the bolts 8 based on a command of the ECU 21. With the bolts 8 thus rotated, the fastening load F applied in the stacking direction of the unit cells 30 is changed, so that the length Lc of the stacked assembly 3 is changed. A strain gauge 8b is installed on the bolt 8, and the fastening load F can be measured based on a measurement value of the strain gauge 8b.

The second embodiment including the mechanism as described above will be described with reference to the flowchart illustrated in FIG. 6. Step S11 and step S12 are identical with step S1 and step S2 of the first embodiment, and therefore, will not be described in detail.

In step S13 executed when an affirmative decision (YES) is obtained in step S12, it is determined whether the fastening load F is larger than a reference value F1. The reference value F1 of the fastening load is a standard fastening load for stacking the unit cells 30 and sandwiching them between the end plates 7, and is a value between a lower-limit value F2 of the fastening load F and an upper-limit value F3 of the fastening load F. The fastening load F may be increased or reduced provided that it lies between the lower-limit value F2 and the upper-limit value F3. Thus, in this embodiment, the fastening load F is reduced when it is larger than the reference value F1, and the fastening load F is increased when it is smaller than the reference value F1. As a result, the vibration of the stacked assembly 3 falls outside the resonance region. The fastening load F can be obtained from its relationship with a value of strain measured by the strain gauge 8b, as shown in FIG. 7. If an affirmative decision (YES) is obtained in step S13, the ECU 21 proceeds to step S14. In step S14, fastening load reduction control is performed. More specifically, the actuators 8a are driven, so as to loose fastening of the bolts 8. In this manner, the length Lc of the stacked assembly 3 is extended or increased. In step S15 following step S14, it is determined again whether the vibration of the stacked assembly 3 is within the resonance region. If a negative decision (NO) is obtained in step S15, namely, if the natural frequency of the stacked assembly 3 falls outside the resonance region, the control returns. On the other hand, if an affirmative decision (YES) is obtained in step S15, the ECU 21 proceeds to step S16. In step S16, it is determined whether the fastening load F is larger than the lower-limit value F2. The lower-limit value F2 may be set as a value at which the unit cells 30 in the stacked assembly 3 do not fall off. If an affirmative decision (YES) is obtained in step S16, namely, if the fastening load F is larger than the lower-limit value F2, and there is room for further reduction of the fastening load F, the ECU 21 returns to step S14, and continues the control for reducing the fastening load F. On the other hand, if a negative decision (NO) is obtained in step S16, the control returns.

If a negative decision (NO) is obtained in step S13, the ECU 21 proceeds to step S17. In step S17, fastening load increase control is performed. More specifically, the actuators 8a are driven, so as to increase fastening of the bolts 8. As a result, the length Lc of the stacked assembly 3 is reduced. In step S18 following step S17, it is determined again whether the vibration of the stacked assembly 3 is within the resonance region. If a negative decision (NO) is obtained in step S18, namely, if the natural frequency of the stacked assembly 3 falls outside the resonance region, the control returns. On the other hand, if an affirmative decision (YES) is obtained in step S18, the ECU 21 proceeds to step S19. In step S19, it is determined whether the fastening load F is lower than the upper-limit value F3. The upper-limit value F3 may be set from the viewpoint of the strength of the stacked assembly 3, and the strength of each unit cell 30. Namely, the upper-limit value F3 may be set to a value within a range in which the stacked assembly 3 and any of the unit cells 30 are not broken. If an affirmative decision (YES) is obtained in step S19, namely, if the fastening load F is smaller than the upper-limit value F3, and there is room for further increase of the fastening load F, the ECU 21 returns to step S17, and continues (the) control for increasing the fastening load F. On the other hand, if a negative decision (NO) is obtained in step S19, the control returns.

As described above, the natural frequency of the stacked assembly 3 is changed by increasing or reducing the fastening load F in the stacking direction of the unit cells 30 in the stacked assembly 3, so that the vibration of the stacked assembly 3 falls outside the resonance region. Thus, the stacked assembly 3 can avoid a resonance phenomenon.

Figure 8:
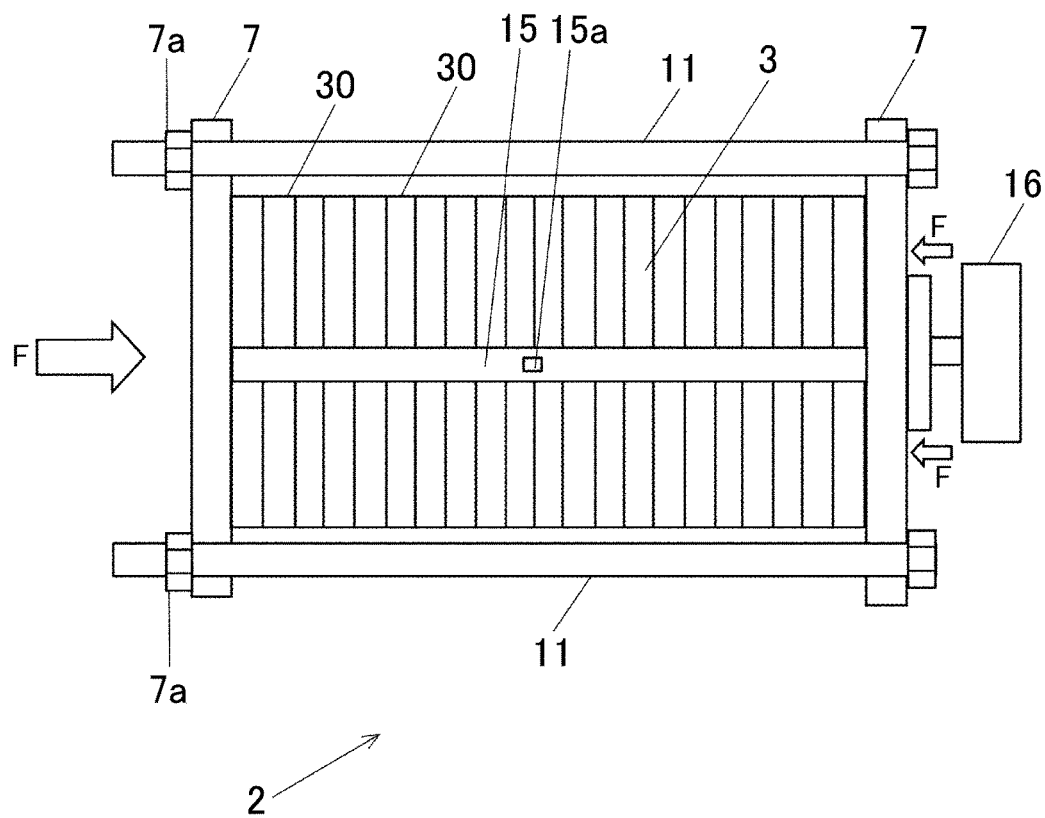
FIG. 8 is an explanatory view schematically showing a stacked condition of unit cells of a stacked assembly according to one embodiment of the invention.

While the actuators 8a are used as a means for changing the fastening load F in the second embodiment, an air actuator 16 may be used, as shown in FIG. 8, for example. Namely, the air actuator 16 may be operated, so as to change the distance between the end plates 7, or the length Lc of the stacked assembly 3, by use of air pressure. In this case, the end plates 7 are fastened by use of general bolts 11, and a plate 15 is placed between the end plates 7. Then, strain of the plate 15 is measured by a strain gauge 15a mounted on the plate 15, and the fastening load F can be obtained from the measurement value. Then, the fastening load F is changed according to the thus obtained fastening load, so that the length Lc of the stacked assembly 3 is changed. As a result, the natural frequency of the stacked assembly 3 can be changed. A hydraulic actuator may be used in place of the air actuator 16. The actuators 8a, air actuator 16, or hydraulic actuator may be regarded as the actuator of the invention.

In the third embodiment of the invention, the natural frequency of the stacked assembly 3 is changed by changing the modulus of longitudinal elasticity E of the stacked assembly 3. As described above with reference to FIG. 3, the acceleration rapidly increases in a certain frequency region, and rapidly decreases once it exceeds the resonance point. Thus, in the first embodiment and the second embodiment, the length of the stacked assembly is changed so that the vibration of the stacked assembly 3 falls outside the resonance region. In the third embodiment, on the other hand, the modulus of longitudinal elasticity E of the stacked assembly 3 is changed so that the vibration of the stacked assembly 3 falls outside the resonance region. The natural frequency of the stacked assembly 3 becomes higher as the modulus of longitudinal elasticity E of the stacked assembly 3 increases, and the natural frequency becomes lower as the modulus of longitudinal elasticity E of the stacked assembly 3 decreases. Accordingly, the natural frequency of the stacked assembly 3 can get out of the resonance region, by increasing or reducing the modulus of longitudinal elasticity E of the stacked assembly 3.

Figure 9:
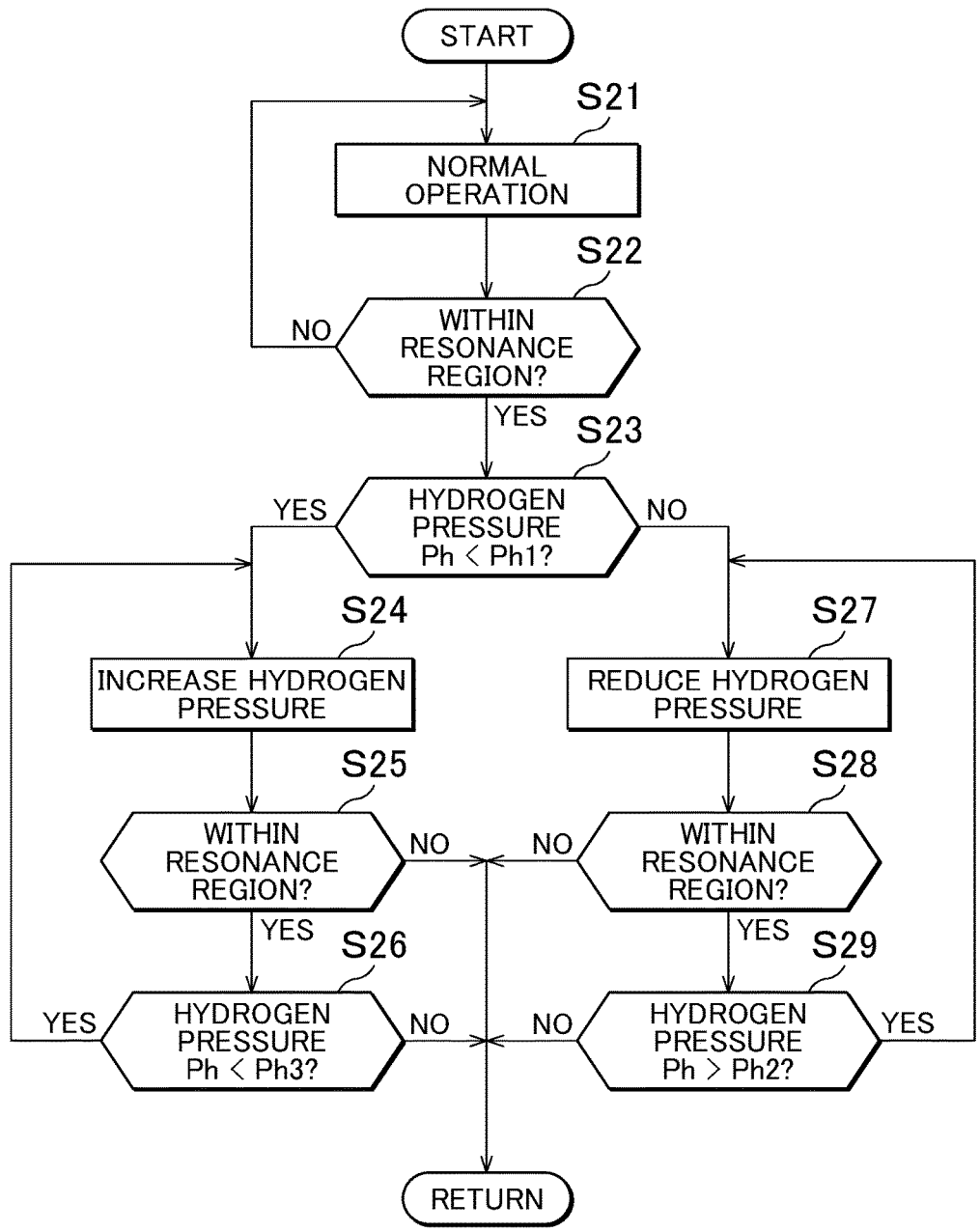
FIG. 9 is a flowchart illustrating one example of control of a fuel cell system according to one embodiment of the invention.

The third embodiment will be described with reference to the flowchart shown in FIG. 9. In the third embodiment, the ECU 21 increases or reduces the pressure of a fluid, more specifically, hydrogen, supplied into the stacked assembly 3, so as to change the modulus of longitudinal elasticity E of the stacked assembly 3 and change the natural frequency. In the flowchart of FIG. 9, step S21 and step S22 are identical with step S1 and step S2 of the first embodiment, and therefore, will not be described in detail.

In step S23 executed when an affirmative decision (YES) is obtained in step S22, it is determined whether the pressure Ph of hydrogen measured by the second pressure gauge P2 is lower than a reference value Ph1. The reference value Ph1 of the pressure Ph of hydrogen is a value that is arbitrarily set among or selected from values that can be taken when the fuel cell 2 is in operation, and is a value between a lower-limit value Ph2 of the pressure Ph of hydrogen and an upper-limit value Ph3 of the pressure Ph of hydrogen. The pressure Ph of hydrogen may be increased or reduced between the lower-limit value Ph2 and the upper-limit value Ph3. Thus, in the third embodiment, the pressure Ph of hydrogen is reduced when it is higher than the reference value Ph1, and the pressure Ph of hydrogen is increased when it is lower than the reference value Ph1. As a result, the stacked assembly 3 gets out of the resonance region.

If an affirmative decision (YES) is obtained in step S23, the ECU 21 proceeds to step S24. In step S24, hydrogen pressure increase control is performed. More specifically, the opening of the pressure regulating valve V2 is increased, or the rotational speed of the circulation pump Pu is increased, so as to increase the pressure Ph of hydrogen supplied to the anode channel 3b. In this manner, the pressure in the anode channel 3b is increased. As a result, the modulus of longitudinal elasticity E of the stacked assembly 3 is increased. In step S25 following step S24, it is determined again whether the vibration of the stacked assembly 3 is within the resonance region. If a negative decision (NO) is obtained in step S25, namely, if the natural frequency of the stacked assembly 3 falls outside the resonance region, the control returns. If, on the other hand, an affirmative decision (YES) is obtained in step S25, the ECU 21 proceeds to step S26. In step S26, it is determined whether the pressure Ph of hydrogen is lower than the upper-limit value Ph3. The upper-limit value Ph3 may be set in view of the pressure resistance of the electrolyte membranes included in the unit cells 30. Namely, if the pressure Ph of hydrogen becomes excessively high, the electrolyte membranes may be broken, or cross leak may take place. Thus, the upper-limit value Ph3 is set from this point of view. If an affirmative decision (YES) is obtained in step S26, namely, if the pressure Ph of hydrogen is lower than the upper-limit value Ph3, and there is room for further increase of the pressure Ph of hydrogen, the ECU 21 returns to step S24, and continues control for increasing the pressure Ph of hydrogen. If, on the other hand, a negative decision (NO) is obtained in step S26, the control returns.

If a negative decision (NO) is obtained in step S23, the ECU 21 proceeds to step S27. In step S27, hydrogen pressure reduction control is performed. More specifically, the opening of the pressure regulating valve V2 is reduced, or the rotational speed of the circulation pump Pu is reduced, so that the pressure Ph of hydrogen supplied to the anode channel 3b is reduced. In this manner, the pressure in the anode channel 3b is reduced. As a result, the modulus of longitudinal elasticity of the stacked assembly 3 is reduced. In step S28 following step S27, it is determined again whether the vibration of the stacked assembly 3 is within the resonance region. If a negative decision (NO) is obtained in step S28, namely, if the natural frequency of the stacked assembly 3 falls outside the resonance region, the control returns. If, on the other hand, an affirmative decision (YES) is obtained in step S28, the ECU 21 proceeds to step S29. In step S29, it is determined whether the pressure Ph of hydrogen is higher than the lower-limit value Ph2. The lower-limit value Ph2 may be set in view of whether hydrogen can reach every unit cell 30. Namely, if the pressure Ph of hydrogen becomes excessively low, hydrogen may not reach the interior of one or more unit cells 30, and the unit cells 30 may deteriorate. From this point of view, the lower-limit Ph2 is set. If an affirmative decision (YES) is obtained in step S29, namely, if the pressure Ph of hydrogen is higher than the lower-limit value Ph2, and there is room for further reduction of the pressure Ph of hydrogen, the ECU 21 returns to step S27, and continues control for reducing the pressure Ph of hydrogen. If, on the other hand, a negative decision (NO) is obtained in step S29, the control returns.

As described above, the natural frequency of the stacked assembly 3 is changed by increasing or reducing the pressure Ph of hydrogen supplied into the stacked assembly 3, so that the vibration of the stacked assembly 3 falls outside the resonance region. Thus, the stacked assembly 3 can avoid a resonance phenomenon.

In the fuel cell system 1, the fluid supplied into the stacked assembly 3 may be air or coolant, other than hydrogen. By increasing or reducing the pressure of any of these fluids, substantially the same effect as that in the case where the pressure of hydrogen is increased or reduced can be obtained. When the object to be controlled is changed from the pressure of hydrogen to the pressure of air, substantially the same control may be basically performed by replacing the pressure of hydrogen with the pressure of air, in the flowchart shown in FIG. 9. More specifically, in a determination step corresponding to step S23, it is determined whether the pressure Pa of air measured by the first pressure gauge P1 is lower than a reference value Pa1. The reference value Pa1 of the pressure Pa of air is a value that is arbitrarily set among or selected from values that can be taken when the fuel cell 2 is in operation, and is a value between a lower-limit value Pa2 of the pressure Pa of air and an upper-limit value Pa3 of the pressure Pa of air. The pressure Pa of air may be increased or reduced between the lower-limit value Pa2 and the upper-limit value Pa3. Thus, the pressure Pa of air is reduced when it is higher than the reference value Pa1, and the pressure Pa of air is increased when it is lower than the reference value Pa1. In this manner, the stacked assembly 3 gets out of the resonance region.

In air pressure increase control corresponding to step S24, or air pressure reduction control corresponding to step S27, the rotational speed of the compressor K is controlled, or the opening of the back pressure valve V1 is adjusted, so as to control the pressure Pa of air supplied to the cathode channel 3a. As a result, the modulus of longitudinal elasticity E of the stacked assembly 3 is changed.

When the object to be controlled is the pressure of air, the upper-limit value Pa3 is set in view of the pressure resistance of the electrolyte membranes included in the unit cells 30. Namely, if the pressure Pa of air becomes excessively high, the electrolyte membranes may be broken, or cross leak may occur. Thus, the upper-limit value Pa3 is set from this point of view. Also, the lower-limit value Pa2 can be set in view of whether the air can reach every unit cell 30. Namely, if the pressure Pa of air becomes excessively low, the air may not be able to reach one or more of the unit cells 30, and these unit cells 30 may deteriorate. Thus, the lower-limit value Pa2 is set from this point of view.

As described above, the natural frequency of the stacked assembly 3 is changed by increasing or reducing the pressure Pa of air supplied into the stacked assembly 3, so that the vibration of the stacked assembly 3 falls outside the resonance region. Thus, the stacked assembly 3 can avoid a resonance phenomenon.

When the object to be controlled is changed from the pressure of hydrogen to the pressure of the coolant, substantially the same control may be basically performed by replacing the pressure of hydrogen with the pressure of the coolant, in the flowchart shown in FIG. 9. More specifically, in a determination step corresponding to step S23, it is determined whether the pressure Pw of the coolant measured by the fourth pressure gauge P4 is lower than a reference value Pw1. The reference value Pw1 of the pressure Pw of the coolant is a value that is arbitrarily set among or selected from values that can be taken when the fuel cell 2 is in operation, and is a value between a lower-limit value Pw2 of the pressure Pw of the coolant and an upper-limit value Pw3 of the pressure Pw of the coolant. The pressure Pw of the coolant may be increased or reduced, between the lower-limit value Pw2 and the upper-limit value Pw3. Thus, the pressure Pw of the coolant is reduced when it is higher than the reference value Pw1, and the pressure Pw of the coolant is increased when it is lower than the reference value Pw1. In this manner, the stacked assembly 3 gets out of the resonance region.

In the coolant pressure increase control corresponding to step S24, or the coolant pressure reduction control corresponding to step S27, the rotational speed of the water pump WP is adjusted, so as to control the pressure Pw of the coolant supplied to the coolant channel 3c. As a result, the modulus of longitudinal elasticity E of the stacked assembly 3 is changed.

When the object to be controlled is the pressure of the coolant, the upper-limit value Pw3 may be set in view of the pressure resistance of a pipe that forms the coolant circulation channel 17. Namely, if the pressure Pw of the coolant becomes excessively high, the pipe that forms the coolant circulation channel 17 may be broken. Thus, the upper-limit value Pw3 is set from this point of view. Also, the lower-limit value Pw2 may be set in view of whether the coolant can circulate through the coolant circulation channel 17. Namely, if the pressure Pw of the coolant becomes excessively low, the coolant may not be able to circulate through the coolant circulation channel 17, and, consequently, the stacked assembly 3 may not be appropriately cooled. Thus, the lower-limit value Pw2 is set, from this point of view.

As described above, the natural frequency of the stacked assembly 3 is changed by increasing or reducing the pressure Pw of the coolant supplied into the stacked assembly 3, so that the vibration of the stacked assembly 3 falls outside the resonance region. Thus, the stacked assembly 3 can avoid a resonance phenomenon.

In the fourth embodiment of the invention, the natural frequency of the stacked assembly 3 is changed by changing the density $\rho$ of the stacked assembly 3. As described above with reference to FIG. 3, the acceleration rapidly increases in a certain frequency region, and rapidly decreases once it exceeds the resonance point. Thus, in the first embodiment and the second embodiment, the length of the stacked assembly is changed so that the natural frequency of the stacked assembly 3 falls outside the resonance region. In the fourth embodiment, on the other hand, the density $\rho$ of the stacked assembly 3 is changed so that the natural frequency of the stacked assembly 3 falls outside the resonance region. The natural frequency of the stacked assembly 3 is reduced as the density ρ of the stacked assembly 3 increases, and the natural frequency is increased as the density ρ of the stacked assembly 3 decreases. Accordingly, the natural frequency of the stacked assembly 3 can get out of the resonance region, by increasing or reducing the density ρ of the stacked assembly 3.

Figure 10:
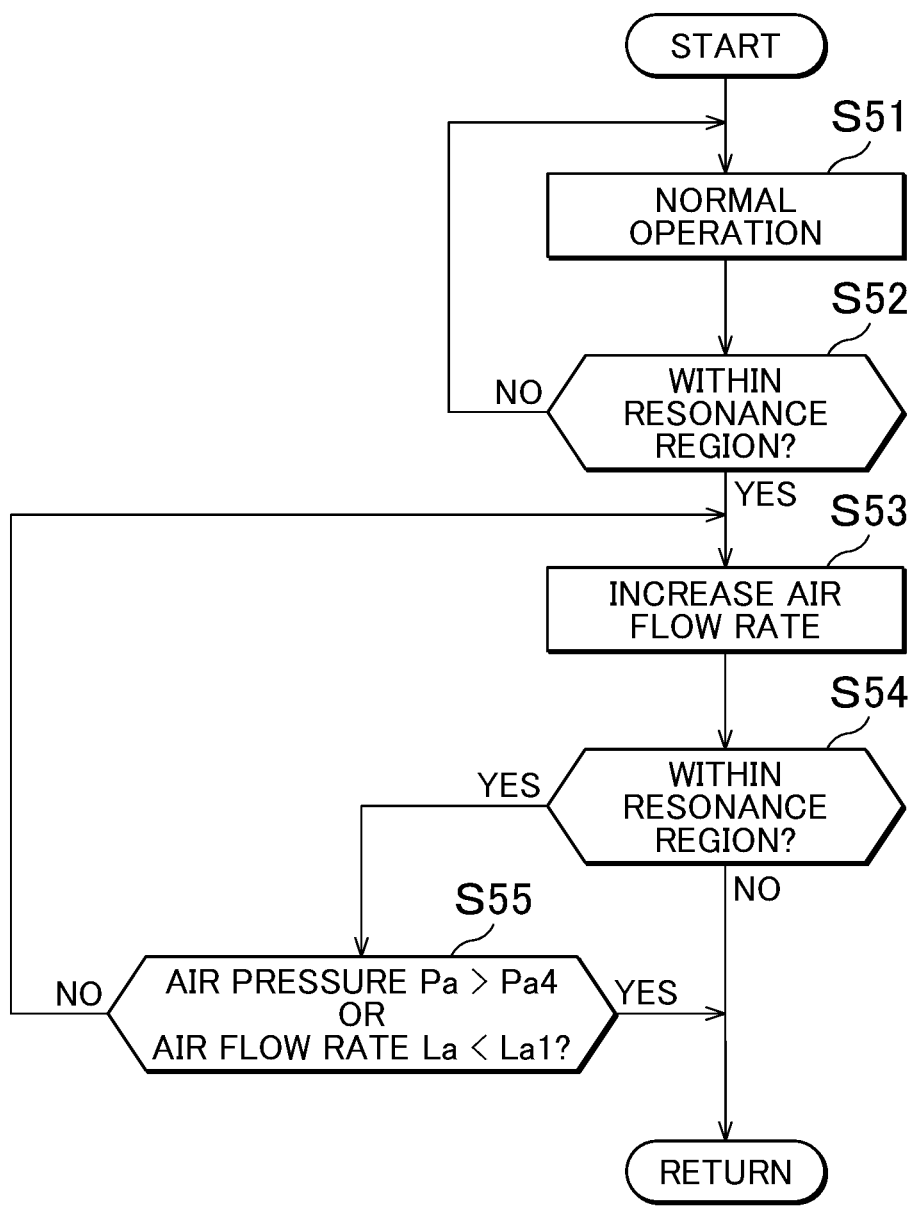
FIG. 10 is a flowchart illustrating one example of control of a fuel cell system according to one embodiment of the invention.

The fourth embodiment will be described with reference to the flowchart illustrated in FIG. 10. In the fourth embodiment, the ECU 21 increases the amount of liquid water contained in the stacked assembly 3, so as to change the density ρ of the stacked assembly 3, and change the natural frequency. In the flowchart of FIG. 10, step S51 and step S52 are identical with step S1 and step S2 of the first embodiment, and therefore, will not be described in detail.

In step S53 executed when an affirmative decision (YES) is obtained in step S52, air flow rate increase control is performed. More specifically, the rotational speed of the compressor K is increased, so as to increase the flow rate of air. In the stacked assembly 3, liquid water produced by power generating reactions may be stored. By increasing the air flow rate, the efficiency with which liquid water is discharged is improved, so that the amount of liquid water contained in the stacked assembly 3 is reduced. As a result, the density ρ of the stacked assembly 3 is reduced. In step S54 following step S53, it is determined again whether the vibration of the stacked assembly 3 is within the resonance region. If a negative decision (NO) is obtained in step S54, namely, if the natural frequency of the stacked assembly 3 falls outside the resonance region, the control returns. If, on the other hand, an affirmative decision (YES) is obtained in step S54, the ECU 21 proceeds to step S55. In step S55, it is determined whether the air pressure Pa measured by the first pressure gauge P1 is higher than a threshold value Pa4, or the air flow rate La measured by the flow meter FM is smaller than a threshold value La1. Since the pressure Pa of air increases as the air flow rate increases, the threshold value Pa4 is set, taking account of the possibility that cross leak occurs if the pressure Pa of air is excessively increased. Namely, the threshold value Pa4 is set to a value at which cross leak can be avoided. The threshold value La1 is set in view of a driving loss of the compressor K, so that the electrolyte membranes will not be brought into a dry condition at a high temperature, for example. In step S55, an affirmative decision (YES) is obtained when either of the condition concerning the air pressure Pa, and the condition concerning the air flow rate La is satisfied. If a negative decision (NO) is obtained in step S55, namely, if there is room for increase of the air flow rate La, the ECU 21 returns to step S53, and continues the control for increasing the air flow rate La. If, on the other hand, an affirmative decision (YES) is obtained in step S55, the control returns.

As described above, the natural frequency of the stacked assembly 3 is changed by increasing the flow rate of air supplied to the stacked assembly 3, and reducing the amount of liquid water contained in the stacked assembly 3, so that the vibration of the stacked assembly 3 falls outside the resonance region. Thus, the stacked assembly 3 can avoid a resonance phenomenon.

While the flow rate of air as a fluid supplied to the stacked assembly is increased in the fourth embodiment, the flow rate of hydrogen may be increased.

In order to reduce the amount of liquid water contained in the stacked assembly 3, air pressure reduction control may be performed in place of the air flow rate increase control in step S53. More specifically, the pressure Pa of air is reduced by increasing the opening of the back pressure valve V1. In the stacked assembly 3, liquid water produced by power generating reactions may be stored. Thus, the amount of liquid water contained in the stacked assembly 3 is reduced by reducing the pressure Pa of air, so as to increase the volumetric flow, and improve the efficiency with which the liquid water is taken away from the stacked assembly 3. As a result, the density ρ of the stacked assembly 3 is reduced. As the air pressure reduction control, the rotational speed of the compressor K may be reduced, or this control may be used along with the opening control of the back pressure valve V1. When the air pressure reduction control is performed, it is determined whether the air pressure Pa measured by the first pressure gauge P1 is higher than a threshold value Pa5, in place of the determining operation in step S55. The threshold value Pa5 may be set in view of whether air can reach every unit cell 30. Namely, if the pressure Pa of air becomes excessively low, air may not be able to reach some of the unit cells 30, and these unit cells 30 may deteriorate. Thus, the threshold value Pa5 is set, from this point of view.

As described above, the natural frequency of the stacked assembly 3 is changed by reducing the pressure Pa of air supplied to the stacked assembly 3 so as to increase the amount of liquid water taken away from the stacked assembly 3 and reduce the amount of liquid water contained in the stacked assembly 3, so that the vibration of the stacked assembly 3 falls outside the resonance region. Thus, the stacked assembly 3 can avoid a resonance phenomenon. While air is focused on as a fluid supplied to the stacked assembly 3, and its pressure is reduced in this example, the pressure of hydrogen may be reduced for the same purpose.

Figure 11:
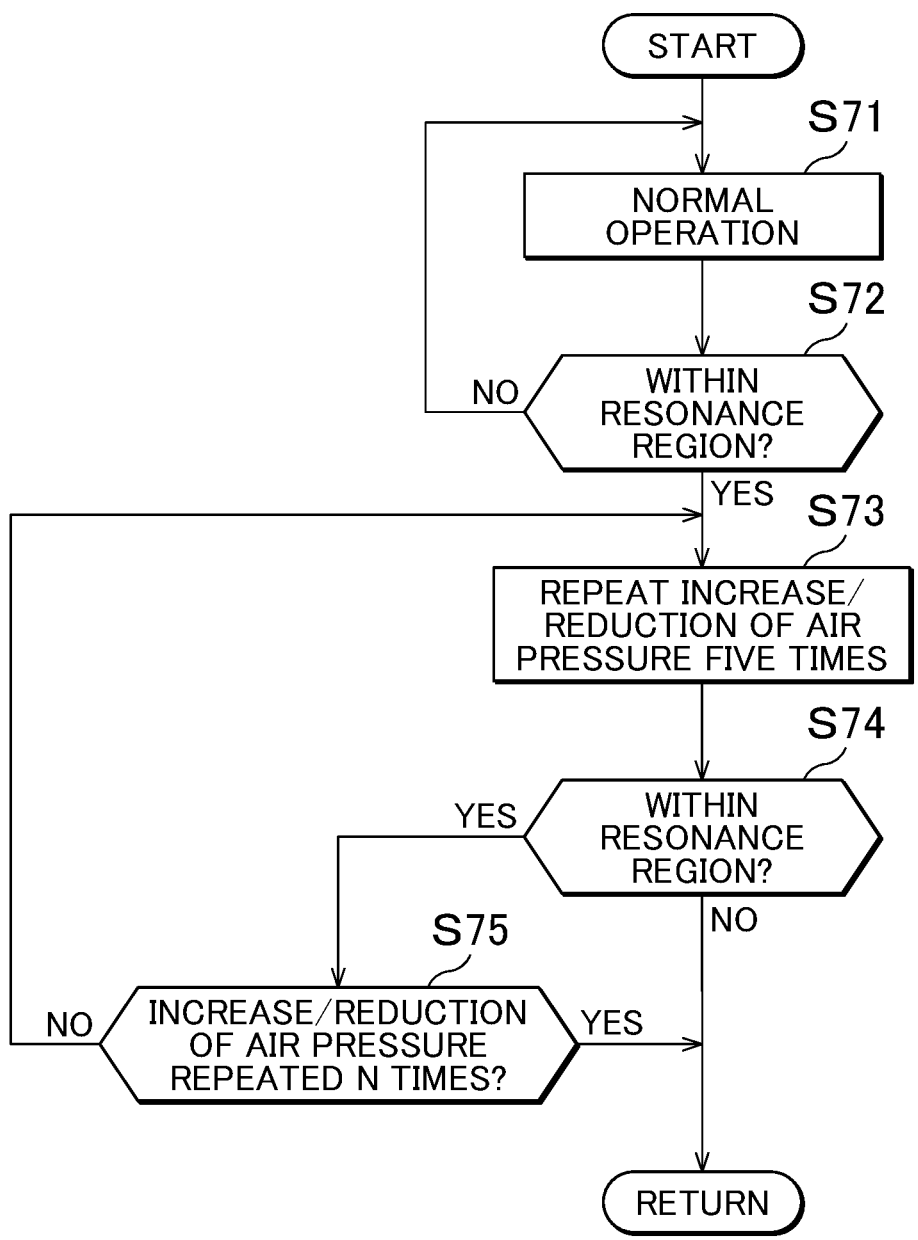
FIG. 11 is a flowchart illustrating one example of control of a fuel cell system according to one embodiment of the invention.

Next, the fifth embodiment of the invention will be described with reference to the flowchart illustrated in FIG. 11. In the fifth embodiment, the amount of liquid water contained in the stacked assembly 3 is reduced, so as to change the density ρ of the stacked assembly 3, and change the natural frequency, as in the fourth embodiment. In the flowchart of FIG. 11, step S71 and step S72 are identical with step S1 and step S2 of the first embodiment, and those steps are not described in detail.

In step S73 executed when an affirmative decision (YES) is obtained in step S72, control of repeating reduction and increase of the air pressure is performed. More specifically, control for reducing the pressure Pa of air by increasing the opening of the back pressure valve V1 and increasing the pressure Pa of air by reducing the opening of the back pressure valve V1 is repeated a plurality of times. In the fifth embodiment, this control is repeated five times. In the stacked assembly 3, liquid water produced by power generating reactions may be stored. Thus, the discharge efficiency of liquid water is improved by repeating reduction and increase of the air pressure Pa several times. As a result, the density ρ of the stacked assembly 3 is reduced. As the air pressure reduction control, the rotational speed of the compressor K may be reduced, or this control may be performed along with opening control of the back pressure valve V1. Also, as the air pressure increase control, the rotational speed of the compressor K may be increased, or this control may be performed along with opening control of the back pressure valve V1. In step S74 following step S73, it is determined again whether the vibration of the stacked assembly 3 is within the resonance region. If a negative decision (NO) is obtained in step S74, namely, if the natural frequency of the stacked assembly 3 falls outside the resonance region, the control returns. If, on the other hand, an affirmative decision (YES) is obtained in step S74, the control proceeds to step S75. In step S75, it is determined whether the control of repeating reduction and increase of the air pressure, namely, the operation of step S73, has been performed N times. Here, N is an arbitrarily chosen integer. If a negative decision (NO) is obtained in step S75, the ECU 21 returns to step S73, and continues the control of repeating reduction and increase of the air pressure. If, on the other hand, an affirmative decision (YES) is obtained in step S75, the control returns.

As described above, the natural frequency of the stacked assembly 3 is changed by repeating reduction and increase of the pressure Pa of air supplied to the stacked assembly 3, and thus reducing the amount of liquid water contained in the stacked assembly 3, so that the vibration of the stacked assembly 3 falls outside the resonance region. In this manner, the stacked assembly 3 can avoid a resonance phenomenon.

While the pressure of air as a fluid supplied to the stacked assembly 3 is reduced and increased in the fifth embodiment, the pressure of hydrogen may be reduced and increased.

Figure 12:
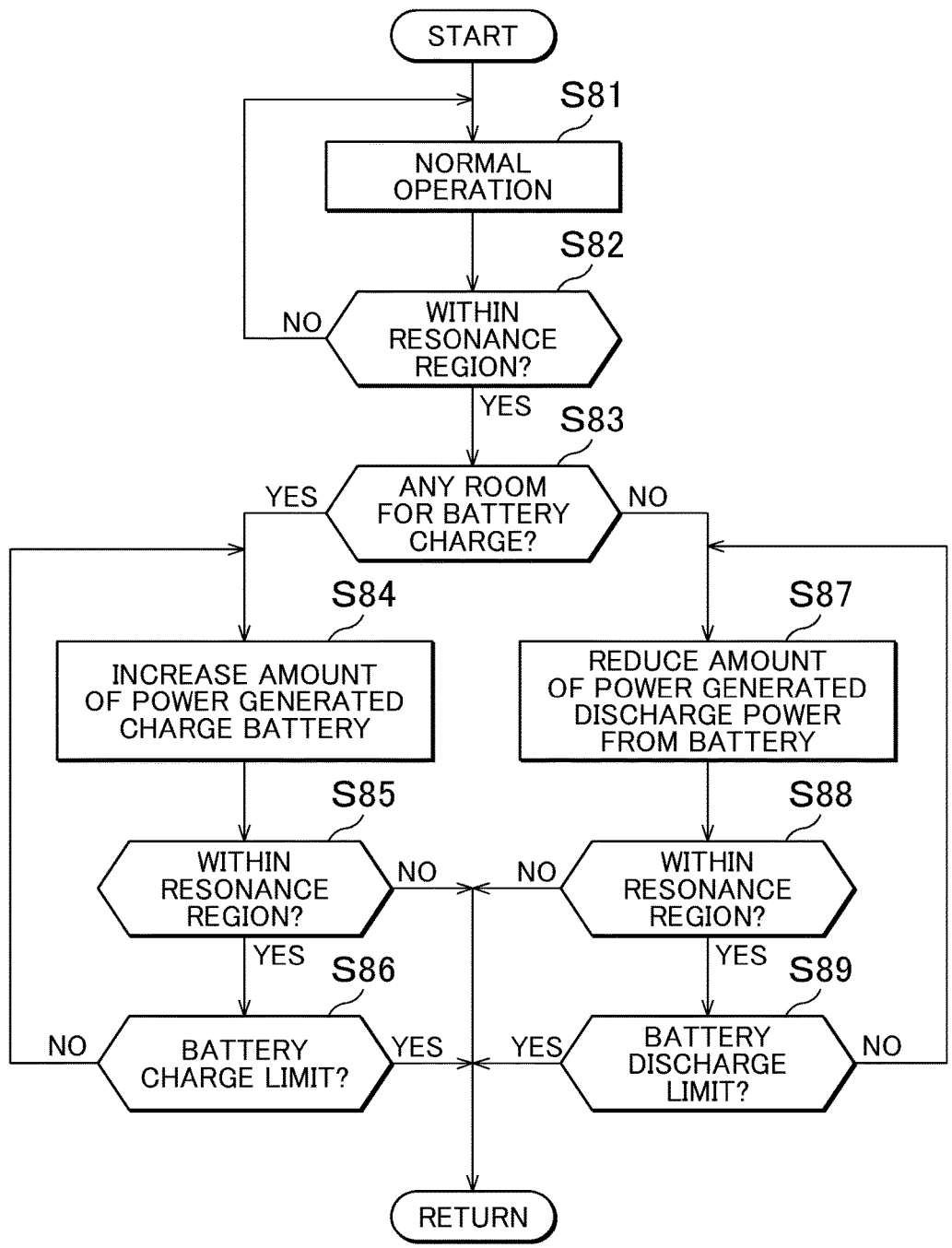
FIG. 12 is a flowchart illustrating one example of control of a fuel cell system according to one embodiment of the invention.

The sixth embodiment of the invention will be described with reference to the flowchart illustrated in FIG. 12. In the sixth embodiment, the amount of liquid water contained in the stacked assembly 3 is increased or reduced, so as to change the density p of the stacked assembly 3, and change the natural frequency. In the sixth embodiment, the ECU 21 increases the amount of liquid water contained in the stacked assembly 3, by increasing the amount of electric power generated in the stacked assembly 3. Also, the ECU 21 reduces the amount of liquid water contained in the stacked assembly 3, by reducing the amount of electric power generated in the stacked assembly 3. In the flowchart of FIG. 12, step S81 and step S82 are identical with step S1 and step S2 of the first embodiment, and therefore, those steps will not be described in detail.

In step S83, executed when an affirmative decision (YES) is obtained in step S82, it is determined whether there is room for charge of the battery 22. Namely, it is determined how much of the capacity of the battery 22 has been charged, and it is determined from the state of charge of the battery 22 whether there is room for charge. The presence or absence of room for charge of the battery 22 is determined in this step, because, if there is room for charge, the battery 22 can be charged with electric power generated even if the amount of electric power generated by the fuel cell 2 is increased. If there is no room for charge, namely, if the battery 22 is in the almost fully charged state, electric power can be supplied from the battery 22 even if the amount of electric power generated by the fuel cell 2 is reduced. Thus, the amount of electric power generated by the fuel cell 2 may be increased or reduced, depending on the presence or absence of room for charge of the battery 22. If the amount of electric power generated by the fuel cell 2 is changed, the amount of liquid water produced by power generation changes. As a result, the density ρ of the stacked assembly 3 changes, and the stacked assembly 3 gets out of the resonance region.

If an affirmative decision (YES) is obtained in step S83, the ECU 21 proceeds to step S84. In step S84, the amount of electric power generated is increased, and battery charge control is performed. More specifically, the amount of electric power generated by the fuel cell 2 is increased, so that the amount of liquid water produced is increased. As a result, the amount of liquid water contained in the stacked assembly 3 is increased, and the density ρ of the stacked assembly 3 is increased. The battery 22 is charged with excess electric power thus generated. In step S85 following step S84, it is determined again whether the vibration of the stacked assembly 3 is within the resonance region. If a negative decision (NO) is obtained in step S85, namely, if the natural frequency of the stacked assembly 3 falls outside the resonance region, the control returns. If, on the other hand, an affirmative decision (YES) is obtained in step S85, the ECU 21 proceeds to step S86. In step S86, it is determined whether the battery 22 reaches a charge limit (namely, whether the battery 22 cannot be charged any more). If a negative decision (NO) is obtained in step S86, namely, if there is room for charge of the battery 22, and there is room for further increase of the amount of electric power generated by the fuel cell 2, the ECU 21 returns to step S84, to continue increasing the amount of electric power generated and controlling battery charge. If, on the other hand, an affirmative decision (YES) is obtained in step S86, the control returns.

If a negative decision (NO) is obtained in step S83, the ECU 21 proceeds to step S87. In step S87, the amount of electric power generated is reduced, and battery discharge control is performed. More specifically, the amount of electric power generated by the fuel cell 2 is reduced, so that the amount of liquid water produced is reduced. As a result, the amount of liquid water contained in the stacked assembly 3 is reduced, and the density ρ of the stacked assembly 3 is reduced. The reduction in the electric power is compensated for by discharge of the battery 22. In step S88 following step S87, it is determined again whether the vibration of the stacked assembly 3 is within the resonance region. If a negative decision (NO) is obtained in step S88, namely, if the natural frequency of the stacked assembly 3 falls outside the resonance region, the control returns. If, on the other hand, an affirmative decision (YES) is obtained in step S88, the ECU 21 proceeds to step S89. In step S89, it is determined whether the battery 22 reaches a discharge limit (namely, whether the battery 22 cannot discharge power any more). If a negative decision (NO) is obtained in step S89, namely, if there is room for discharge of the battery 22, and there is room for further reduction of the amount of electric power generated by the fuel cell 2, the ECU 21 returns to step S87, to continue reducing the amount of electric power generated and battery discharge control. If, on the other hand, an affirmative decision (YES) is obtained in step S89, the control returns.

As described above, the natural frequency of the stacked assembly 3 is changed by increasing the amount of electric power generated in the stacked assembly 3 so as to increase the amount of liquid water contained in the stacked assembly 3, or reducing the amount of electric power generated in the stacked assembly 3 so as to reduce the amount of liquid water contained in the stacked assembly 3. As a result, the vibration of the stacked assembly 3 falls outside the resonance region. Thus, the stacked assembly 3 can avoid a resonance phenomenon.

This invention is not limited to the above-described embodiments, but may be embodied with various changes or modifications. In the embodiments described in this specification, the acceleration sensor AS is installed on the stacked assembly 3 of the fuel cell 2, and it is determined whether the vibration of the stacked assembly 3 is within the resonance region during running of the vehicle. Then, various measures are taken based on this determination. On the other hand, it may be determined whether the natural frequency of the stacked assembly 3 is within the resonance region during vehicle inspection, and measures, such as correction of a control program of the fuel cell 2, may be taken, based on this determination.

What is claimed is:

1. A fuel cell system comprising:

a stacked assembly including a plurality of unit cells stacked together, each of the unit cells including an electrolyte membrane and a pair of electrodes between which the electrolyte membrane is sandwiched;

a resonance determining unit configured to determine whether vibration of the stacked assembly, which occurs during running of a vehicle, is within a resonance region of the stacked assembly; and a controller configured to change a natural frequency of the stacked assembly such that the vibration of the stacked assembly falls outside the resonance region if the resonance determining unit determines that the vibration of the stacked assembly is within the resonance region.

2. The fuel cell system according to claim 1, wherein the controller is configured to change a length of the stacked assembly in a stacking direction of the unit cells if the resonance determining unit determines that the vibration of the stacked assembly is within the resonance region.

3. The fuel cell system according to claim 1, wherein the controller is configured to increase or reduce a temperature of the stacked assembly if the resonance determining unit determines that the vibration of the stacked assembly is within the resonance region.

4. The fuel cell system according to claim 3, further comprising
a water pump configured to supply a coolant to the stacked assembly, wherein
the controller is configured to change a rotational speed of the water pump to increase or reduce the temperature of the stacked assembly if the resonance determining unit determines that the vibration of the stacked assembly is within the resonance region.

5. The fuel cell system according to claim 2, wherein the controller is configured to increase or reduce a fastening load applied to the stacked assembly in the stacking direction of the unit cells if the resonance determining unit determines that the vibration of the stacked assembly is within the resonance region.

6. The fuel cell system according to claim 5, further comprising
an actuator configured to change the fastening load, wherein
the controller is configured to control the actuator to increase or reduce the fastening load if the resonance determining unit determines that the vibration of the stacked assembly is within the resonance region.

7. The fuel cell system according to claim 1, wherein the controller is configured to increase or reduce a pressure of a fluid supplied to the stacked assembly if the resonance determining unit determines that the vibration of the stacked assembly is within the resonance region.

8. The fuel cell system according to claim 7, further comprising
a gas supply device configured to supply a reaction gas into the stacked assembly, wherein
the controller is configured to control the gas supply device to increase or reduce the pressure of the reaction gas if the resonance determining unit determines that the vibration of the stacked assembly is within the resonance region.

9. The fuel cell system according to claim 1, wherein the controller is configured to increase or reduce an amount of liquid water contained in the stacked assembly if the resonance determining unit determines that the vibration of the stacked assembly is within the resonance region.

10. The fuel cell system according to claim 9, wherein the controller is configured to increase a flow rate of a fluid supplied to the stacked assembly to reduce the amount of liquid water contained in the stacked assembly if the resonance determining unit determines that the vibration of the stacked assembly is within the resonance region.

11. The fuel cell system according to claim 9, wherein the controller is configured to increase an amount of electric power generated in the stacked assembly to increase the amount of liquid water contained in the stacked assembly if the resonance determining unit determines that the vibration of the stacked assembly is within the resonance region, or
the controller is configured to reduce the amount of electric power generated in the stacked assembly to reduce the amount of liquid water contained in the stacked assembly if the resonance determining unit determines that the vibration of the stacked assembly is within the resonance region.

12. The fuel cell system according to claim 9, wherein the controller is configured to reduce a pressure of a fluid supplied to the stacked assembly to reduce the amount of liquid water contained in the stacked assembly if the resonance determining unit determines that the vibration of the stacked assembly is within the resonance region.

13. The fuel cell system according to claim 7, wherein the fluid is a coolant, and the controller is configured to increase or reduce a pressure of the coolant supplied to the stacked assembly if the resonance determining unit determines that the vibration of the stacked assembly is within the resonance region.

14. A fuel cell system comprising:
a stacked assembly including a plurality of unit cells stacked together, each of the unit cells including an electrolyte membrane, and a pair of electrodes between which the electrolyte membrane is sandwiched;
an acceleration sensor installed on the stacked assembly and configured to analyze vibration of the stacked assembly to determine whether the vibration of the stacked assembly is within a resonance region of the stacked assembly;
a natural frequency control device configured to change at least one of a length of the stacked assembly, a density of the stacked assembly, and a modulus of longitudinal elasticity of the stacked assembly; and
a controller configured to control the natural frequency control device to change at least one of the length of the stacked assembly, the density of the stacked assembly, and the modulus of longitudinal elasticity of the stacked assembly if the vibration of the stacked assembly analyzed by the acceleration sensor is within the resonance region.

15. The fuel cell system according to claim 14, wherein the natural frequency control device is configured to change at least one of an amount of a fluid supplied to the stacked assembly and a pressure of the fluid supplied to the stacked assembly if the vibration of the stacked assembly analyzed by the acceleration sensor is within the resonance region.

* * * * *